United States Patent
Kratzer et al.

(10) Patent No.: US 10,086,337 B2
(45) Date of Patent: Oct. 2, 2018

(54) COMPOSITE CARBON MOLECULAR SIEVE MEMBRANES HAVING ANTI-SUBSTRUCTURE COLLAPSE PARTICLES LOADED IN A CORE THEREOF

(71) Applicant: L'Air Liquide, Societe Anonyme pour l'Etude et l'Exploitation des Procedes Georges Claude, Paris (FR)

(72) Inventors: Dean W. Kratzer, Warwick, MD (US); Madhava R. Kosuri, Newark, DE (US); Canghai Ma, Newark, DE (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 14/827,064

(22) Filed: Aug. 14, 2015

(65) Prior Publication Data

US 2016/0151746 A1    Jun. 2, 2016

Related U.S. Application Data

(60) Provisional application No. 62/085,625, filed on Nov. 30, 2014.

(51) Int. Cl.
  *B01D 67/00*   (2006.01)
  *B01D 71/02*   (2006.01)
  (Continued)

(52) U.S. Cl.
  CPC ......... *B01D 67/0067* (2013.01); *B01D 53/02* (2013.01); *B01D 53/228* (2013.01);
  (Continued)

(58) Field of Classification Search
  CPC .... B01D 53/02; B01D 53/228; B01D 53/229; B01D 2053/224; B01D 63/021;
  (Continued)

(56) References Cited

U.S. PATENT DOCUMENTS 4,127,625 A   11/1978   Arisaka et al.
4,685,940 A   8/1987   Soffer et al.
(Continued)

FOREIGN PATENT DOCUMENTS

EP   0 428 052   5/1991
JO   2013 063415   4/2013
(Continued)

OTHER PUBLICATIONS

Fuertes, A.B. et al., "Carbon composite membranes from Matrimid(R) and Kapton(R) polyimides for gas separation", Microporous and Mesoporous Materials, 33, 1999, pp. 115-125.*

(Continued)

*Primary Examiner* — Jason M Greene
(74) *Attorney, Agent, or Firm* — Christopher J. Cronin

(57) ABSTRACT

A carbon molecular sieve (CMS) membrane is made by pyrolyzing, to a peak pyrolysis temperature $T_P$, a hollow fiber membrane having a polymeric sheath surrounding a polymeric core, anti-substructure collapse particles present in pores formed in the polymeric core help prevent collapse of pores formed in the hollow fiber membrane before pyrolysis. The anti-substructure collapse particles are made of a material or materials that either: i) have a glass transition temperature $T_G$ higher than $T_P$, ii) have a melting point higher than $T_P$, or ii) are completely thermally decomposed during said pyrolysis step at a temperature less than $T_P$. The anti-substructure collapse particles are not soluble in a solvent used for dissolution of the polymeric material of the core.

6 Claims, 3 Drawing Sheets

(51) Int. Cl.
  *B01D 71/64* (2006.01)
  *B01D 53/22* (2006.01)
  *B01D 69/08* (2006.01)
  *B01D 53/02* (2006.01)
  *B01D 63/02* (2006.01)
  *B01D 69/02* (2006.01)

(52) U.S. Cl.
  CPC ......... *B01D 53/229* (2013.01); *B01D 63/021* (2013.01); *B01D 69/02* (2013.01); *B01D 69/08* (2013.01); *B01D 69/088* (2013.01); *B01D 71/021* (2013.01); *B01D 71/64* (2013.01); *B01D 2053/224* (2013.01); *B01D 2253/116* (2013.01); *B01D 2323/18* (2013.01); *B01D 2325/02* (2013.01); *B01D 2325/12* (2013.01)

(58) Field of Classification Search
  CPC .... B01D 67/0067; B01D 69/02; B01D 69/08; B01D 69/088; B01D 71/021; B01D 71/64; B01D 2253/102; B01D 2253/116; B01D 2323/18; B01D 2325/02; B01D 2325/12
  See application file for complete search history.

(56) References Cited

U.S. PATENT DOCUMENTS

| | | | |
|---|---|---|---|
| 5,599,380 A | 2/1997 | Koros | |
| 5,799,960 A | 9/1998 | Davis, Sr. | |
| 6,500,233 B1 | 12/2002 | Miller et al. | |
| 6,565,631 B2 | 5/2003 | Koros et al. | |
| 7,947,114 B2 | 5/2011 | Hagg et al. | |
| 2007/0017861 A1* | 1/2007 | Foley | B01D 53/228 210/500.27 |
| 2007/0087120 A1* | 4/2007 | Connors | B01D 67/0067 427/228 |
| 2007/0209506 A1* | 9/2007 | Liu | B01D 53/228 95/45 |
| 2010/0212503 A1 | 8/2010 | Yoshimune et al. | |
| 2011/0072965 A1 | 3/2011 | Lie et al. | |
| 2011/0100211 A1 | 5/2011 | Kiyono et al. | |
| 2011/0247360 A1* | 10/2011 | Hasse | B01D 71/64 62/606 |
| 2012/0245014 A1* | 9/2012 | Jones | B04B 1/20 494/37 |
| 2013/0025458 A1 | 1/2013 | Li et al. | |
| 2013/0152793 A1 | 6/2013 | Bhuwania et al. | |
| 2015/0182921 A1* | 7/2015 | Koros | B01D 67/0067 96/4 |
| 2015/0209721 A1* | 7/2015 | Hinklin | B01D 53/228 96/11 |
| 2015/0290596 A1* | 10/2015 | Koros | B01D 53/228 95/45 |

FOREIGN PATENT DOCUMENTS

| | | | | |
|---|---|---|---|---|
| JP | 2012 040464 | | 3/2012 | |
| JP | 2013-63415 | * | 4/2013 | ............ B01D 63/02 |
| WO | WO 01/97956 | | 12/2001 | |
| WO | WO 2016 048479 | | 3/2016 | |
| WO | WO 2016/048479 A1 | * | 3/2016 | ............ B01D 69/08 |

OTHER PUBLICATIONS

Hagg, M-B., et al., "Carbon Molecular Sieve Membranes for Gas Separation," Membrane Engineering for the Treatment of Gases, vol. 2: Gas-separation Problems Combined with Membrane Reactors, Jul. 6, 2011, 162.
Ismail, A. F., et al., "A review on the latest development of carbon membranes for gas separation", Journal of Membrane Science 193 (2001), 1-18.
Jiang L. Y., et al., "Dual-layer hollow carbon fiber membranes for gas separation consisting of carbon and mixed matrix layers", Carbon 45 (2007), 166-172.
Li, L., et al., "A high $CO_2$ permselective mesoporous silica/carbon composite membrane for $CO_2$ separation", Carbon 50 (2012), 5186-5195.
Park, H. B., et al., "Novel Pyrolytic Carbon Membranes Containing Silica: Preparation and Characterization", Chem. Mater. 2002, 14, 3034-3046.
Park, H. B., et al., "Pyrolytic carbon membranes containing silica derived from poly(imide siloxane): the effect of siloxane chain length on gas transport behavior and a study on the separation of mixed gases", Journal of Membrane Science 235 (2004), 87-98.
Park, H. B., et al., "Pyrolytic carbon membranes containing silica: morphological approach on gas transport behavior", Journal of Molecular Structure 739 (2005), 179-190.
Robeson, L. M.; "The upper bound revisited", Journal of Membrane Science, 2008, vol. 320, 390-400.
International Search Report and Written Opinion for PCT/US2015/062406, mailed Feb. 4, 2016.
Dia, et al., "Ultem®/ZIP-8 mixed matrix hollow fiber membranes for $CO_2/N_2$ separations," Journal of Membrane Science, vols. 401-402, 2012, pp. 76-82.
Jiang, et al., "Dual-layer hollow carbon fiber membranes for gas separation consisting of carbon and mixed matrix layers," Carbon, vol. 45, 2007, pp. 166-172.
Ma, et al., "Ester-Cross-linkable Composite Hollow Fiber Membranes for $CO_2$ Removal from Natural Gas," Industrial & Engineering Chemistry Research, vol. 52, 2013, pp. 10495-10505.
Xu, Liren, "Carbon Molecular Sieve Hollow Fiber Membranes for Olefin/Paraffin Separations," Doctoral Dissertation, Georgia Institute of Technology, Dec. 2012, pp. xvii, 121 and 122.

* cited by examiner

COMPOSITE CARBON MOLECULAR SIEVE MEMBRANES HAVING ANTI-SUBSTRUCTURE COLLAPSE PARTICLES LOADED IN A CORE THEREOF

CROSS-REFERENCE TO RELATED APPLICATIONS

This application claims the benefit of priority under 35 U.S.C. §119 (e) to U.S. Provisional Patent Application No. 62/085,625, filed Nov. 30, 2014, the entire contents of which are incorporated herein by reference.

BACKGROUND

Field of the Invention

The present invention relates to carbon molecular sieve membranes and gas separations utilizing the same.

Related Art

Membranes are often preferred to other gas separation techniques in industry due to the following advantages. The energy consumption for membranes is low as they do not require a phase change for separation. Membrane modules are compact, thereby reducing their footprint and capital cost. Membranes are also mechanically robust and reliable because they have no moving parts.

Polymer membranes in particular are used in a wide variety of industrial applications. They enable the production of enriched nitrogen from air. They separate hydrogen from other gases in refineries. They are also used to remove carbon dioxide from natural gas.

However, owing to the manufacturing processes and material structure, today's polymeric membranes cannot reach both high selectivities and permeabilities, because a trade-off exists between permeability and selectivity. Robeson formulated semi-empirical upper-bound trade-off lines for several gas pairs. (Robeson, "The upper bound revisited", Journal of Membrane Science 2008, vol 320, pp 390-400 (2008)). Carbon membranes exceed this upper-bound and therefore are quite promising.

Since the production of crack-free, hollow fiber, carbon molecular sieve membranes (CMS membranes) in the late 80s, researchers have shown that these carbon membranes offer several advantages over polymeric membranes. They have better intrinsic properties and exhibit better thermal and chemical stability. Thus, they have minimal plasticization affects.

CMS membranes are produced by pyrolyzing polymeric precursor membranes (i.e., green membranes) at temperatures of about 400-700° C. in a controlled atmosphere. In regards to controlled atmosphere, US 2011100211A discloses the importance of oxygen doping during pyrolysis process. It claims that oxygen doping can be tuned in order to obtain the desired properties for the CMS membrane.

The properties of CMS membranes also depend upon the choice of precursor polymer. Various polymer precursors are disclosed in the non-patent as being suitable for formation of CMS membranes. U.S. Pat. No. 6,565,631 discloses the use of Matrimid and 6FDA/BPDA-DAM. U.S. Pat. No. 7,947, 114 discloses the use of cellulose acetate polymer. US 2010/0212503 discloses the use of polyphenylene oxide (PPO).

While the above disclosures have shown that the CMS membrane materials have superior intrinsic characteristics compared to those of precursor polymeric materials, there still exists a challenge of making high flux CMS hollow fiber membranes. This challenge is related to the fiber substructure morphology. In hollow fiber membrane spinning, a composition including polymer and solvent (aka the dope solution) and a bore fluid are extruded from a spinneret. The bore is extruded from a circular conduit while the dope solution is extruded from an annulus directly surrounding the bore fluid.

The dope solution composition can be described in terms of a ternary phase diagram as shown in FIG. 1. The polymer loading and amounts of solvent and non-solvent are carefully controlled in order to produce a single phase that is close to binodal. That way, as the extruded bore fluid and dope solution exit the spinneret and traverse through an air gap, solvent evaporating from the dope solution causes the exterior of the dope solution to solidify, thereby forming an ultrathin, dense skin layer. As the nascent fiber is plunged into a coagulant bath containing non-solvent, exchange of solvent and non-solvent from the fiber to the bath and vice-versa causes the remaining, inner portion of the now-solidifying fiber to form a two-phase sub-structure of solid polymer and liquid solvent/non-solvent.

After drying to remove remaining amounts of the solvent and non-solvent, the spaces in the sub-structure formerly containing solvent and non-solvent are left as an interconnecting network of pores within that sub-structure that contribute towards high flux. The final result is an asymmetric green fiber comprising a thin, dense skin over a thick, less dense, porous sub-structure.

During pyrolysis process, the pore network in the sub-structure collapses and densifies with the result of producing an effectively much thicker dense skin layer. Since flux is dense skin layer-dependent, a very thick dense skin can significantly decrease the flux exhibited by the CMS membrane. While the use of higher glass transition temperature (Tg) polymers in the dope solution may lower the relative degree of substructure pore collapse, suitably high fluxes are predicted to remain elusive without a solution to the foregoing problem.

Researchers have come up with two different approaches for making high flux CMS hollow fiber membranes.

One approach is to form a thin walled fiber. Since essentially the entire fiber wall collapses during pyrolysis to form an effectively much thicker dense skin layer, the obvious method of increasing the permeance of a hollow fiber membrane is to decrease its overall wall thickness. The drawback of this method is that, as fiber wall thickness is reduced, the strength of the resultant CMS membrane is compromised.

Therefore, it is an object of the invention to provide a CMS membrane (and method making the same) having a relatively high flux that exhibits a satisfactory degree of strength.

Another approach is to form silica structures within the CMS membrane. US 20130152793 discloses the immersion of precursor hollow fibers in vinyl-trimethoxy silane (VTMS) for about 1 day, withdrawing them from the VTMS, and allowing them to remain in an ambient air environment for about another day. After removal, the VTMS impregnated in the fiber reacts with moisture in the air to form a silica structure in the pores of the fiber substructure. This silica structure prevents those pores from collapsing during the subsequent pyrolysis. While this approach helps improve the CMS membrane flux, it does require an additional lengthy processing step (immersion within VTMS) above and beyond conventional techniques. An additional processing step creates a bottleneck to the overall production process that was not previously present with conventional techniques. An additional processing step also introduces another opportunity for poorly controlled variables to lead to non-uniform CMS membranes over time. An additional processing step also increases the footprint of the manufacturing process. Moreover, VTMS is a flammable liquid requiring careful handling. As a result of the foregoing issues, from a cost, complexity, throughput rate, manufacturing uniformity, manufacturing footprint, and safety point of view, the approach advocated by US 20130152793 is not fully satisfactory.

Therefore it is another object of the invention to provide a CMS membrane (and method of making the same) that does not require an additional processing step beyond conventional techniques, which is relatively less expensive, which is less complex, which does not pose a bottleneck to an overall throughput of manufacture, and which is relatively more safe than the solution proposed by US 20130152793.

SUMMARY

There is disclosed method for producing a CMS membrane that comprises the following steps. Composite precursor polymeric hollow fibers are formed, each having a sheath covering a hollow core, the core comprising a polymeric material and silica particles. The composite precursor polymeric hollow fibers are pyrolyzed.

There is also disclosed a method for separating a gas mixture that comprises the following steps. The gas mixture is fed to the CMS membrane made according to the above-disclosed method. A permeate gas is withdrawn from one side of the CMS membrane that is enriched in at least one gas relative to the gas mixture. A non-permeate gas is withdrawn from an opposite side of the CMS membrane that is deficient in said at least one gas relative to the gas mixture.

There is also disclosed a method for producing a CMS membrane fiber, comprising the following steps. A composite precursor polymeric hollow fiber is formed having a sheath covering a hollow core, the core being solidified from a core composition comprising a polymeric core material dissolved in a core solvent and anti-substructure collapse particles insoluble in the core solvent, the anti-substructure collapse particles being disposed within pores formed in the polymeric core material, the sheath being solidified from a sheath composition comprising a polymeric sheath material dissolved in a sheath solvent, the anti-substructure collapse particles having an average size of less than one micron. The composite precursor polymeric hollow fiber is pyrolyzed up to a peak pyrolysis temperature $T_P$. The anti-substructure collapse particles are made of a material or materials that either: i) have a glass transition temperature $T_G$ higher than $T_P$, ii) have a melting point higher than $T_P$, or ii) are completely thermally decomposed during said pyrolysis step at a temperature less than $T_P$.

There is also disclosed a CMS membrane module including a plurality of the above-disclosed CMS membrane fibers.

There is also disclosed a method for separating a gas mixture, comprising the steps of feeding a gas mixture to the above-disclosed CMS membrane module, withdrawing a permeate gas from the CMS membrane module that is enriched in at least one gas relative to the gas mixture, and withdrawing a non-permeate gas from the CMS membrane module that is deficient in said at least one gas relative to the gas mixture.

Any of the methods, resultant CMS membrane, CMS membrane fiber, or CMS membrane module may include one or more of the following aspects:

- the sheath does not contain silica particles.
- the silica particles are of submicron particle size.
- the polymer of the core and sheath is 6FDA:BPDA/DAM.
- the core does not contain Matrimid.
- the core contains less than 100% Matrimid.
- the sheath does not contain Matrimid.
- the sheath contains less than 20% Matrimid.
- the material or materials of the anti-substructure collapse particles are selected from the group consisting of: polymerics, glasses, ceramics, graphite, and mixtures of two or more thereof.
- the material of the anti-substructure collapse particles is polybenzimidazole.
- the material of the anti-substructure collapse particles is silica.
- the material or materials of the anti-substructure collapse particles are selected from cellulosic materials and polyethylene.
- the polymeric sheath material and the polymeric core material are a same polymer or copolymer.
- a wt % of the polymer or copolymer in the core composition is lower than a wt % of the polymer or copolymer in the sheath composition.
- the polymeric sheath material is different from the polymeric core material.
- the polymeric sheath material comprises a major amount of a first polymer or copolymer and a minor amount of second polymer or copolymer and the polymeric core material comprises a minor amount of the first polymer or copolymer and a major amount of the second polymer or copolymer.
- the polymeric sheath material is a first polymer having a first coefficient of thermal expansion, the polymeric core material is a second polymer having a second coefficient of thermal expansion, and the first and second coefficients of thermal expansion differ from one another by no more than 15%.
- the first coefficient of thermal expansion is greater than the second coefficient of thermal expansion.
- a wt % of the anti-substructure collapse particles in the core composition is selected such that the polymeric sheath material shrinks along a length of the fiber no more than +/−15% than that of the polymeric core material, but in any case is at least 5 wt %.
- the polymeric sheath material is a first polymer exhibiting a first coefficient of thermal shrinkage above a temperature at which the first polymer starts to thermally degrade, the polymeric core material is a second polymer having a second coefficient of thermal shrinkage above a temperature at which the second polymer starts to thermally degrade, and the first and second coefficients of thermal shrinkage differ from one another by no more than 15%.
- the polymeric sheath material is a first polymer, the polymeric core material is a second polymer, and the second polymer has a glass transition temperature equal to or greater than 200° C.
- the second polymer has a glass transition temperature equal to or greater than 280° C.
- the polymeric core material is poly(meta-phenyleneisophthalamide).

the polymeric core material is the condensation product of 2,2-bis[4-(2,3-dicarboxyphenoxy)phenyl]propane dianhydride and m-phenylenediamine or p-phenylenediamine.

the polymeric core material is polybenzimidazole each of the polymeric core and sheath materials is made of a polymer or copolymer selected from the group consisting of polyimides, polyether imides, polyamide imides, cellulose acetate, polyphenylene oxide, polyacrylonitrile, and combinations of two or more thereof.

the polyimide is 6FDA:BPDA/DAM.

the polyimide consists of the repeating units of formula I:

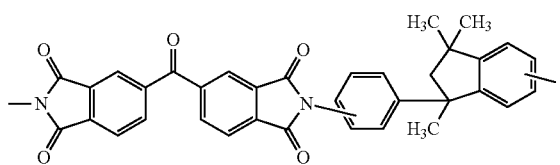

(I)

the polyimide is selected from the group consisting of: 6FDA:mPDA/DABA and 6FDA:DETDA/DABA.

the polymeric sheath material is poly (4,4'-oxydiphenylene-pyromellitimide).

the polymeric sheath material consists of the repeating units of formulae II and III:

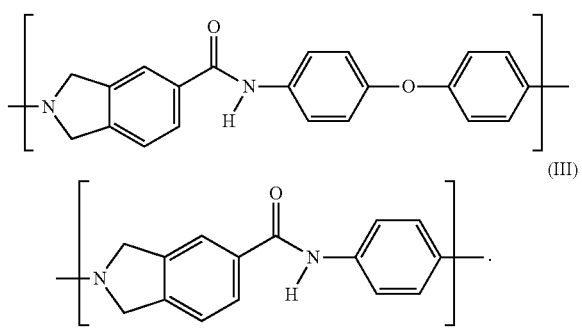

(II)

(III)

the polyimide consists of repeating units of formula IV:

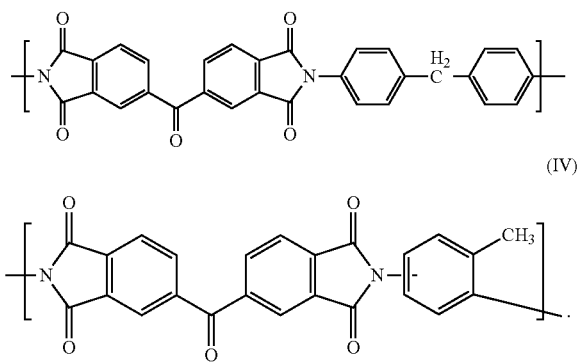

(IV)

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
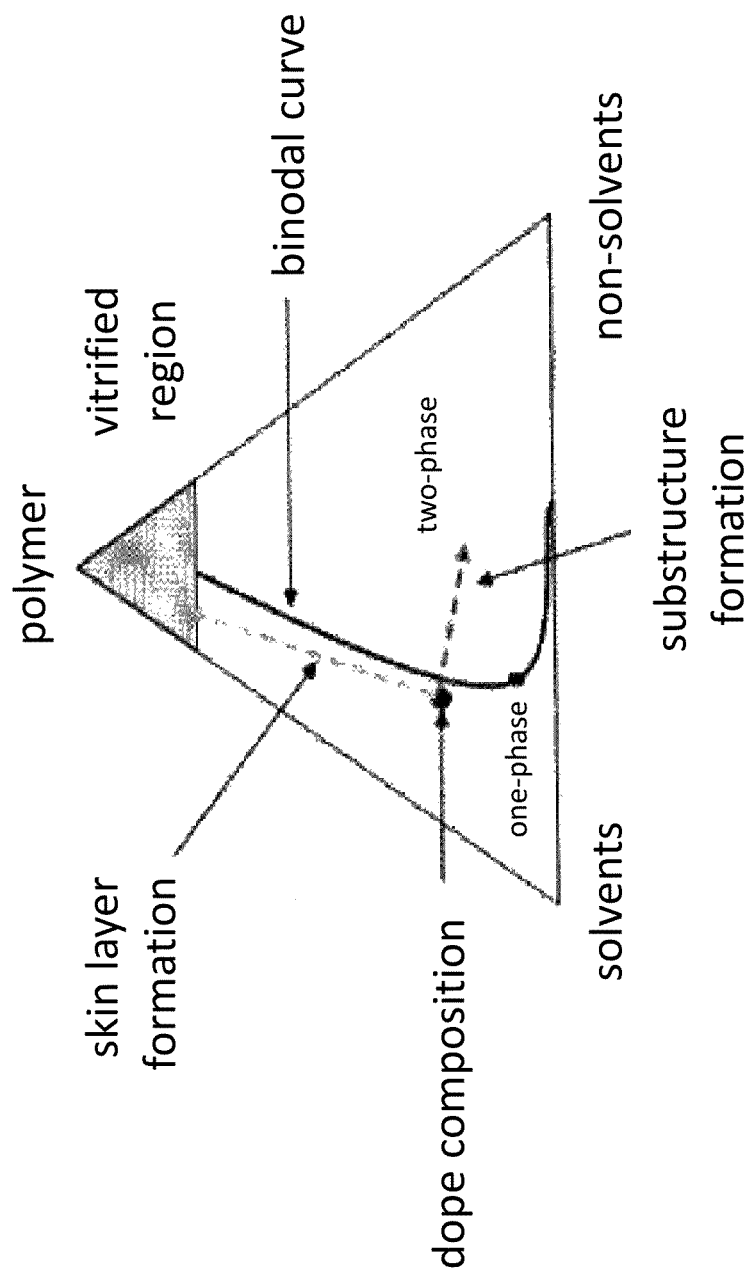
FIG. 1 is an illustrative phase diagram of for mixtures of polymer, solvent and non-solvent.

During pyrolysis of the precursor hollow fiber, effectively thick dense films (that are caused by collapse of the fiber wall) may be prevented by forming the precursor hollow fiber with a composite morphology that includes a sheath covering a core that comprises a polymer core material and sub-micron size anti-substructure collapse particles.

The anti-substructure collapse particles are made of materials that may act in one of two ways. They thermally decompose substantially completely during pyrolysis, at a temperature less than a peak pyrolysis temperature, to yield a porous core in the final CMS membrane fiber product that exhibits high flux. Alternatively, they do not form pores themselves during pyrolysis and do not flow or melt at the peak temperature during pyrolysis. Rather, they prevent the pores that are already present in the precursor hollow fiber from collapsing during pyrolysis so as to yield a porous core in the final CMS membrane fiber product that also exhibits high flux.

In the absence of the anti-substructure collapse particles of the invention, the pores that are present in the core of the precursor hollow fiber would collapse during pyrolysis and the core would densify so as to yield a relatively non-porous core in the final CMS membrane fiber, and more importantly, an effectively much thicker dense layer that prevents relatively high flux through the membrane.

The first type of material used for the anti-substructure collapse particles include organic materials such as cellulosic materials and polyethylene.

The second type of material used for the anti-substructure collapse particles include polymers or copolymers that have a glass transition temperature, $T_G$, higher than a peak temperature reached during pyrolysis. These polymers or copolymers are insoluble in the solvent used to dissolve the polymeric core material, because if they did in fact dissolve in that solvent, they would no longer result in solid particles inhibiting collapse of the pores in the core during pyrolysis. Particularly suitable polymers or copolymers have a $T_G$ that is at least 50° C. higher than the peak pyrolysis temperature. One example is polybenzimidazole (PBI).

The second type of material used for the anti-substructure collapse particles also includes inorganic materials that have a melting point higher than the peak pyrolysis temperature. Particularly suitable inorganic materials have a melting point that is at least 50° C. higher than the peak pyrolysis temperature. Examples include glasses (such as particulate fiberglass), ceramics (such as $ZiO_2$, $TiO_2$, perovskites, zeolites, and silica. Suitable silica particles may be obtained from Spectrum Chemical Corp. under the trade name Cab-O-Sil M-5.

Regardless of which type of anti-substructure collapse particle material is used, because the core is not densified to the degree of the ultrathin dense film in practice of the invention, the flux of permeate through the membrane far exceeds conventional CMS membranes that do not incorporate a solution to the problem of pore collapse in the core. Those skilled in the art will recognize that the pyrolyzed polymeric sheath material is densified and primarily responsible for separation of fluids. The dense film formed from pyrolysis of the sheath is quite thin (often as little as 0.01 and as much as 5 microns, but typically 0.01 to 0.10 microns) so as to not reduce the overall flux through the membrane. The skilled artisan will recognize that thinner dense films yield higher fluxes and thicker dense films yield lower fluxes. On the other hand, the much thicker pyrolyzed core material is relatively porous and presents little resistance to permeation of fluids through the membrane as a whole and thus exhibits high flux.

The composite CMS hollow fiber membrane may be made by either of two general methods. First, it may be made by co-extrusion of the core and sheath in the shape of a hollow fiber, phase inversion/coagulation of the nascent hollow fiber, and pyrolysis of the coagulated fiber. Second, it may be made by extrusion of the core in the shape of a hollow fiber, coagulation of the nascent hollow fiber, coating of the coagulated hollow fiber with the polymeric material of the sheath, and pyrolysis of the coated fiber.

In the first general method, two different compositions (dope solutions) are prepared. The core dope solution comprises the polymeric core material dissolved in a solvent and the anti-substructure collapse particles uniformly mixed in the polymer solution. The sheath dope solution comprises the polymeric sheath material dissolved in a solvent. A typical procedure is broadly outlined as follows. A bore fluid is fed through an inner annular channel of spinneret designed to form a cylindrical fluid stream positioned concentrically within the fibers during extrusion of the fibers. A number of different designs for hollow fiber extrusion spinnerets known in the art may be used. Suitable embodiments of hollow-fiber spinneret designs are disclosed in U.S. Pat. No. 4,127,625 and U.S. Pat. No. 5,799,960, the entire disclosures of which are hereby incorporated by reference. The bore fluid is preferably one of the solvents (for example, NMP) described above for use in the core or sheath dope solutions, but a mixture of water and a solvent may be used as well. The core dope solution is fed through an intermediate annular channel of the spinneret surrounding the bore fluid and the sheath dope solution is fed through an outer annular channel of the spinneret surrounding the fed core dope solution. A nascent composite hollow fiber is obtained from the extrusion through the spinneret of the fed bore fluid and core and sheath dope solutions.

With continued reference to the first general method, the diameter of the eventual solid polymeric precursor fiber is partly a function of the size of the hollow fiber spinnerets. The outside diameter of the spinneret annulus from which the core dope solution is extruded can be from about 400 μm to about 2000 μm, with a bore solution capillary-pin outside diameter from 200 μm to 1000 μm. The inside diameter of the bore solution capillary is determined by the manufacturing limits for the specific outside diameter of the pin. The temperature of the core and sheath dope solutions during delivery to the spinneret and during spinning of the hollow fiber depends on various factors including the desired viscosity of the dispersion within the spinneret and the desired fiber properties. At higher temperature, viscosity of the dispersion will be lower, which may facilitate extrusion. At higher spinneret temperatures, solvent evaporation from the surface of the nascent fiber will be higher, which will impact the degree of asymmetry or anisotropy of the fiber wall. In general, the temperature is adjusted in order to obtain the desired viscosity of the dispersion and the desired degree of asymmetry of the fiber wall. Typically, the temperature is from about 20° C. to about 100° C., preferably from about 40° C. to about 80° C.

Upon extrusion from the spinneret, the nascent polymeric hollow fiber is passed through an air gap and immersed in a suitable liquid coagulant bath. In the air gap, an amount of the solvent from the extruded sheath dope solution evaporates and a solid polymeric skin layer is formed. In other words, the dissolved polymeric sheath material solidifies into a skin layer. The liquid coagulant bath facilitates phase inversion of the dissolved polymeric core and sheath materials and solidification of the remaining portions of the precursor composite membrane structure. The coagulant constitutes a non-solvent or a poor solvent for the polymeric material(s) while at the same time a good solvent for the solvent(s) within the core and dope solutions. As a result, exchange of solvent and non-solvent from the fiber to the bath and vice-versa causes the remaining, inner portion of the nascent fiber (i.e., substantially the core) to form a two-phase substructure of solid polymer and liquid solvent/non-solvent as it is drawn through the liquid coagulant bath. Suitable liquid coagulants include water (with or without a water-soluble salt) and/or alcohol with or without other organic solvents. Typically, the liquid coagulant is water.

With continued reference to the first general method, the concentration(s) of the polymeric material(s) and the relative amounts of the solvent(s) and non-solvent are selected so as to produce single phases in the core and dope solutions that are close to binodal. That way, as the extruded bore fluid and core and sheath dope solutions exit the spinneret and traverse through an air gap, solvent evaporating from the sheath dope solution causes the exterior of the extruded sheath dope solution to vitrify, thereby forming an ultrathin, dense skin layer. The two-phase substructure of the remaining portions of the nascent composite fiber (i.e., substantially the core) includes a matrix of polymer and pores that are filled with silica particles, solvent(s) and non-solvent.

Typically, the solidified fiber is then withdrawn from the liquid coagulant bath and wound onto a rotating take-up roll, drum, spool, bobbin or other suitable conventional collection device. An aspect of the extruding, immersing, and winding steps includes controlling the ratio of solidified fiber windup rate to nascent fiber extrusion rate. This ratio is also sometimes called "draw ratio". One of ordinary skill in the art will recognize that the combination of spinneret dimensions and draw ratio serve to control the precursor fiber dimensions to the desired specifications.

Before or after collection, the fiber is optionally washed to remove any residual solvent(s) and non-solvent. After collection, the fiber is dried in order to remove any remaining solvent(s) or non-solvent). After the drying and optional washing steps, the pores that formerly containing solvent and non-solvent remain filled with the silica particles. Thus, an asymmetric, composite hollow precursor fiber is formed that comprises an ultrathin, dense skin over a thick core including silica particle-filled pores.

In the second general method, a core dope solution and a sheath coating solution are prepared. The core dope solution comprises the polymeric core material dissolved in a solvent and the anti-substructure collapse particles uniformly mixed in the polymer solution. The sheath coating solution comprises the polymeric sheath material dissolved in a solvent.

The second general method is similar in many ways to the first general method with the following exceptions. Instead of being co-extruded with the core dope solution from a spinneret, the sheath coating composition is coated onto the coagulated hollow fiber (with optional processing steps known in the art of membrane manufacturing in between coagulation and coating for enhancing the achievement of a robust, uniform coating).

Regardless of whether the first or second general method is employed, the completed precursor composite hollow fibers have an outer diameter that typically ranges from about 150-550 μm (optionally 200-300 μm) and an inner diameter that typically ranges from 75-275 μm (optionally 100-150 μm). In some cases unusually thin walls (for example, thicknesses less than 30 μm) may be desirable to maximize productivity while maintaining desirable durability. The desired final thickness of the CMS membrane sheath layer (after extrusion, drawing, and pyrolysis) can be achieved by selection of appropriate spinneret dimensions (as the case may be), coating conditions (as the case may be), draw ratios, and pyrolysis conditions to later result in sheath thicknesses as thin as 0.01-0.10 microns. The desired final thickness of the CMS membrane core layer can similarly be achieved through selection of appropriate values for the corresponding conditions.

As mentioned above, the polymeric sheath material is primarily responsible for the separation of the fluids (i.e., gases, vapors and/or liquids) and is selected based upon separation performance. The polymeric sheath material may be any polymer or copolymer known in the field of polymeric membranes for fluid separation and includes, but is not limited to, polyimides, polyether imides, polyamide imides, cellulose acetate, polyphenylene oxide, polyacrylonitrile, and combinations of two or more thereof.

Typical polyimides include 6FDA:BPDA/DAM, 6FDA/mPDA:DABA, 6FDA/DETDA:DABA, Matrimid, Kapton, and P84. 6FDA:BPDA/DAM, shown below, is a polyimide synthesized by thermal imidization from three monomers: 2,4,6-trimethyl-1,3-phenylene diamine (DAM), 2,2'-bis(3,4-dicarboxyphenyl hexafluoropropane) (6FDA), and 3,3',4,4'-biphenyl tetracarboxylic acid dianhydride (BPDA). 6FDA:BPDA/DAM is a polyimide made up repeating units of 6FDA/DAM and BPDA/DAM:

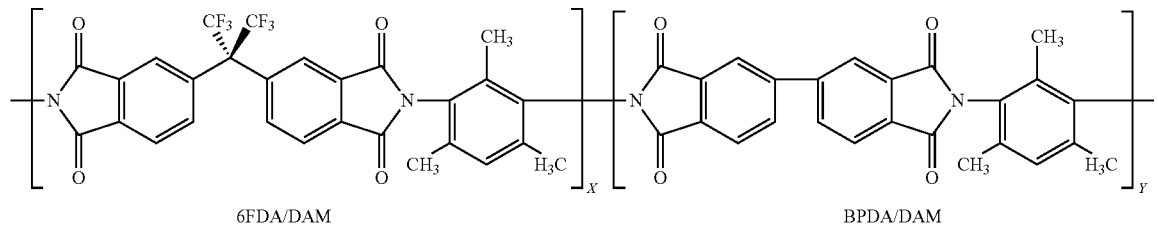

6FDA/mPDA:DABA is a polyimide synthesized by thermal imidization from three monomers: 2,2'-bis(3,4-dicarboxyphenyl hexafluoropropane) (6FDA), 1,3-phenylenediamine (mPDA), and 3,5-diaminobenzoic acid (DABA). 6FDA/DETDA:DABA is a polyimide synthesized by thermal imidization from three monomers: 2,2'-bis(3,4-dicarboxyphenyl hexafluoropropane) (6FDA), 2,5-diethyl-6-methyl-1,3-diamino benzene (DETDA), and 3,5-diaminobenzoic acid (DABA). Matrimid has the repeating units of formula I:

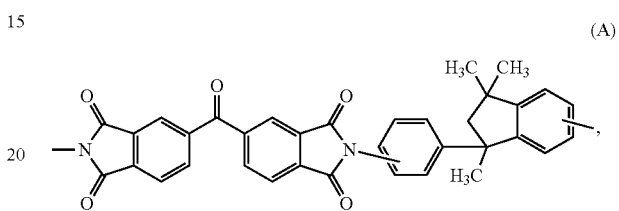

(A)

Kapton is poly (4,4'-oxydiphenylene-pyromellitimide). P84 consists of repeating units of formula IV:

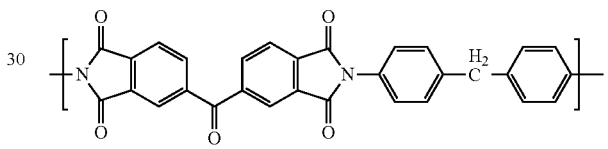

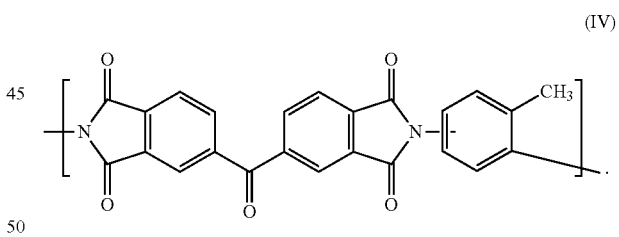

(IV)

A suitable polyether imide includes Ultem having the repeating units of formula C:

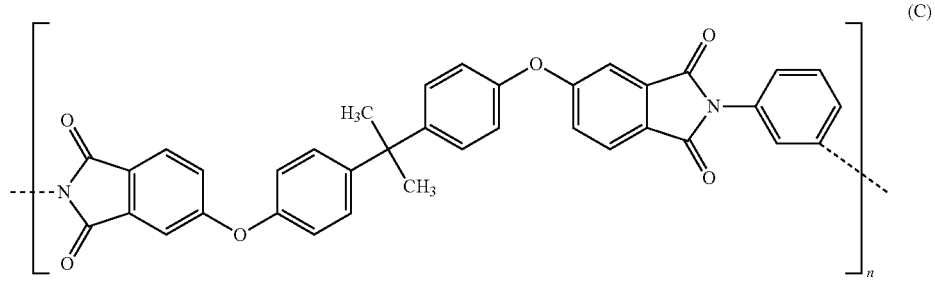

(C)

A suitable polyamide imide includes Torlon having the repeating units of formulae D and E:

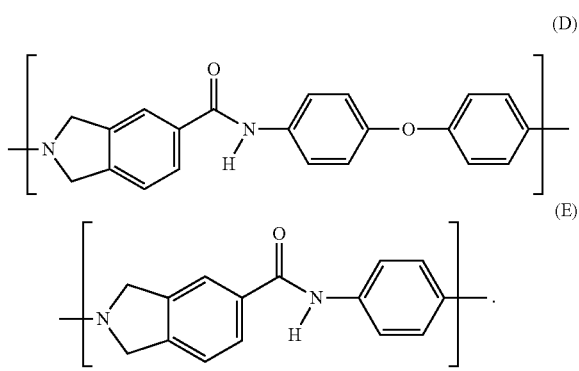

The polymeric core and sheath material(s) may be the same or different. They typically has a relatively higher glass transition temperature (Tg) in order to reduce the degree to which non-silica-filled pores in the core collapse, assuming that the membrane does not spend relatively much time above its Tg during pyrolysis. One such polymer is 6FDA:BPDA/DAM.

In order to inhibit delamination of non-identical sheath and core polymeric materials during pyrolysis, a portion of the polymeric sheath material may include a major amount (e.g., greater than 50 wt % and as much as 99 wt %) of a first polymer or copolymer and a minor amount (e.g., less than 50 wt % and as little as 1 wt %) of second polymer or copolymer. Similarly, the polymeric core material comprises a minor amount (e.g., less than 50 wt % and as little as 1 wt %) of the first polymer or copolymer and a major amount (e.g., greater than 50 wt % and as much as 99 wt %) of the second polymer or copolymer. By blending in an amount of each polymer in each layer, the affinity of the core for the sheath may be enhanced.

As another technique for inhibiting delamination of non-identical sheath and core polymeric materials during pyrolysis, the polymeric sheath material is a first polymer having a first coefficient of thermal expansion, the polymeric core material is a second polymer having a second coefficient of thermal expansion, and the first and second coefficients of thermal expansion differ from one another by no more than 15%. By at least roughly matching the coefficients of thermal expansion, unevenness in the linear expansion along the length of the fiber during the heating of the pyrolysis step may be reduced or virtually eliminated. Typically, the first coefficient of thermal expansion is greater than the second coefficient of thermal expansion since the sheath will need to expand to a greater outer diameter than will the core.

Delamination may also occur due to mismatches between the thermal shrinkage that occurs after the pyrolysis temperature reaches the temperature at which one or more polymers begin to thermally degrade. In order to inhibit or virtually eliminate this different cause of delamination, the amount of anti-substructure collapse particle loading may be adjusted in the core to reduce the amount of shrinkage that may occur in the core. In other words, as more and more of the volume of the core is taken up by the particles instead of by polymer, shrinkage of the core due to the core polymer flowing/shrinking/thermally degrading is reduced more and more. Thus, the wt % of the anti-substructure collapse particles in the core composition is selected such that the polymeric sheath material shrinks along a length of the fiber no more than +/−15% than that of the polymeric core material, but in any case is at least 5 wt %.

An alternative technique for inhibiting or virtually eliminating this second cause of delamination, the polymeric sheath material may be a first polymer exhibiting a first coefficient of thermal shrinkage above a temperature at which the first polymer starts to thermally degrade, the polymeric core material is a second polymer having a second coefficient of thermal shrinkage above a temperature at which the second polymer starts to thermally degrade, and the first and second coefficients of thermal shrinkage differ from one another by no more than 15%.

The polymeric core material may be any polymer or copolymer known in the field of membrane fluid separation. Suitable polymeric core materials include a polyaramide available as NOMEX that consists of repeating units of diamino mesitylene isophthalic acid, Ultem as described above, and polybenzimidazole (PBI). Since the main purpose of the polymeric core material is to provide strength, it desirably exhibits a relatively high tensile strength. As a rough proxy for tensile strength, the polymer core material's glass transition may be utilized. Thus, the polymeric core material may have a glass transition temperature equal to or greater than 200° C., typically equal to or grater than 280° C.

Suitable solvents for the core and dope solution polymer(s) may include, for example, dichloromethane, tetrahydrofuran (THF), N-methyl-2-pyrrolidone (NMP), and others in which the resin is substantially soluble, and combinations thereof. For purposes herein, "substantially soluble" means that at least 98 wt % of the polymer in the solution is solubilized in the solvent. Typical solvents include N-methylpyrrolidone (NMP), N,N-dimethylacetamide (DMAC), N,N-dimethylformamide (DMF), dimethyl sulfoxide (DMSO), gamma-butyrolactone (BLO), dichloromethane, THF, glycol ethers or esters, and mixtures thereof. The core dope solution may also include a pore former such as $CaBr_2$.

The concentration(s) of the polymer(s) in the core and dope solutions is typically driven by the configuration of the precursor composite membrane (the green fiber before pyrolysis). Typically, the concentration will range from 12-35 wt % (or optionally 15-30 wt % or even 18-22 wt %).

The precursor composite hollow fibers are then at least partially, and optionally fully, pyrolyzed to form the final CMS membrane. Because of the presence of the silica particles inside the pores of the precursor fiber core, those pores do not collapse during pyrolysis as they ordinarily would in conventional CMS membrane manufacturing processes. After pyrolysis, the silica particle-filled pores form an interconnecting network in the core through which a high flux of gas is allowed. If the silica particles were not present, the pores of the precursor fibers would collapse during pyrolysis to yield an effectively thick dense film. Since the flux is related to the thickness of the dense film, the flux in the absence of the silica particles would be undesirably low.

While any known device for pyrolyzing the membrane may be used, typically, the pyrolysis equipment includes a quartz tube within a furnace whose temperature is controlled with a temperature controller.

Pyrolysis may be optionally carried out under vacuum typically ranging from about 0.01 mm Hg to about 0.10 mm Hg or even as low as 0.05 mm Hg or lower. In this case, the ends of the quartz tube are sealed in order to reduce any leaks. In vacuum pyrolysis, a vacuum pump is used in conjunction with a liquid nitrogen trap to prevent any back diffusion of oil vapor from the pump and also a pressure transducer for monitoring the level of vacuum within the quartz tube.

Typically, the pyrolysis atmosphere inside the chamber is an inert gas having a relatively low concentration of oxygen, such as those disclosed by US 2011/0100211. By selecting a particular oxygen concentration (i.e., through selection of an appropriate low-oxygen inert purge gas) or by controlling the oxygen concentration of the pyrolysis atmosphere, the gas separation performance properties of the resulting CMS membrane may be controlled or tuned. While any inert gas in the field of polymeric pyrolysis may be utilized as a purge gas during pyrolysis, suitable inert gases include argon, nitrogen, helium, and mixtures thereof. The ambient atmosphere surrounding the CMS membrane may be purged with an amount of inert purge gas sufficient to achieve the desired oxygen concentration or the pyrolysis chamber may instead be continuously purged. While the oxygen concentration, either of the ambient atmosphere surrounding the CMS membrane in the pyrolysis chamber or in the inert gas is less than about 50 ppm, it is typically less than 40 ppm or even as low as about 8 ppm, 7 ppm, or 4 ppm.

While the pyrolysis temperature may range from 500-1,000° C., typically it is between about 450-800° C. As two particular examples the pyrolysis temperature may be 1,000° C. or more or it may be maintained between about 500-550° C. The pyrolysis includes at least one ramp step whereby the temperature is raised over a period of time from an initial temperature to a predetermined temperature at which the polymer is pyrolyzed and carbonized. The ramp rate may be constant or follow a curve. The pyrolysis may optionally include one or more pyrolysis soak steps (i.e., the pyrolysis temperature may be maintained at a particular level for a set period of time) in which case the soak period is typically between about 1-10 hours or optionally from about 2-8 or 4-6 hours.

An illustrative heating protocol may include starting at a first set point (i.e., the initial temperature) of about 50° C., then heating to a second set point of about 250° C. at a rate of about 3.3° C. per minute, then heating to a third set point of about 535° C. at a rate of about 3.85° C. per minute, and then a fourth set point of about 550° C. at a rate of about 0.25 degrees centigrade per minute. The fourth set point is then optionally maintained for the determined soak time. After the heating cycle is complete, the system is typically allowed to cool while still under vacuum or in the controlled atmosphere provided by purging with the low oxygen inert purge gas.

Another illustrative heating protocol (for final temperatures up to 550° C. has the following sequence: 1) ramp rate of 13.3° C./min from 50° C. to 250° C.; 2) ramp rate of 3.85° C./min from 250° C. to 15° C. below the final temperature ($T_{max}$); 3) ramp rate of 0.25° C./min from $T_{max}$−15° C. to $T_{max}$; 4) soak for 2 h at $T_{max}$.

Yet another illustrative heating protocol (for final temperatures of greater than 550° C. and no more than 800° C. has the following sequence: 1) ramp rate of 13.3° C./min from 50° C. to 250° C.; 2) ramp rate of 0.25° C./min from 250° C. to 535° C.; 3) ramp rate of 3.85° C./min from 535° C. to 550° C.; 4) ramp rate of 3.85° C./min from 550° C. to 15° C. below the final temperature $T_{max}$; 5) ramp rate of 0.25° C./min from 15° C. below the final temperature $T_{max}$ to $T_{max}$; 6) soak for 2 h at $T_{max}$.

Still another heating protocol is disclosed by U.S. Pat. No. 6,565,631. Its disclosure is incorporated herein by reference.

After the heating protocol is complete, the membrane is allowed to cool in place to at least 40° C. while still under vacuum or in the inert gas environment.

While the source of inert gas may already have been doped with oxygen to achieve a predetermined oxygen concentration, an oxygen-containing gas such as air or pure oxygen may be added to a line extending between the source of inert gas and the furnace via a valve such as a micro needle valve. In this manner, the oxygen-containing gas can be added directly to the flow of inert gas to the quartz tube. The flow rate of the gas may be controlled with a mass flow controller and optionally confirmed with a bubble flow meter before and after each pyrolysis process. Any oxygen analyzer suitable for measuring relatively low oxygen concentrations may be integrated with the system to monitor the oxygen concentration in the quartz tube and/or the furnace during the pyrolysis process. Between pyrolysis processes, the quartz tube and plate may optionally be rinsed with acetone and baked in air at 800° C. to remove any deposited materials which could affect consecutive pyrolyses.

Following the pyrolysis step and allowing for any sufficient cooling, the gas separation module is assembled. The final membrane separation unit can comprise one or more membrane modules. These can be housed individually in pressure vessels or multiple modules can be mounted together in a common housing of appropriate diameter and length. A suitable number of pyrolyzed fibers are bundled to form a separation unit and are typically potted with a thermosetting resin within a cylindrical housing and cured to form a tubesheet. The number of fibers bundled together will depend on fiber diameters, lengths, and on desired throughput, equipment costs, and other engineering considerations understood by those of ordinary skill in the art. The fibers may be held together by any means known in the field. This assembly is typically disposed inside a pressure vessel such that one end of the fiber assembly extends to one end of the pressure vessel and the opposite end of the fiber assembly extends to the opposite end of the pressure vessel. The tubesheet and fiber assembly is then fixably or removably affixed to the pressure vessel by any conventional method to form a pressure tight seal.

For industrial use, a permeation cell or module made using the pyrolyzed CMS membrane fibers may be operated, as described in U.S. Pat. No. 6,565,631, e.g., as a shell-tube heat exchanger, where the feed is passed to either the shell or tube side at one end of the assembly and the product is removed from the other end. For maximizing high pressure performance, the feed is advantageously fed to the shell side of the assembly at a pressure of greater than about 10 bar, and alternatively at a pressure of greater than about 40 bar. The feed may be any gas having a component to be separated, such as a natural gas feed containing an acid gas such as $CO_2$ or air or a mixture of an olefin and paraffin.

The described preparation of CMS membranes leads to an almost pure carbon material in the ultrathin dense film. Such materials are believed to have a highly aromatic structure comprising disordered $sp^2$ hybridized carbon sheet, a so-called "turbostratic" structure. The structure can be envisioned to comprise roughly parallel layers of condensed hexagonal rings with no long range three-dimensional crystalline order. Pores are formed from packing imperfections between microcrystalline regions in the material and their structure in CMS membranes is known to be slit-like. The CMS membrane typically exhibits a bimodal pore size distribution of micropores and ultramicropores—a morphology which is known to be responsible for the molecular sieving gas separation process.

The micropores are believed to provide adsorption sites, and ultramicropores are believed to act as molecular sieve sites. The ultramicropores are believed to be created at "kinks" in the carbon sheet, or from the edge of a carbon sheet. These sites have more reactive unpaired sigma electrons prone to oxidation than other sites in the membrane. Based on this fact, it is believed that by tuning the amount of oxygen exposure, the size of selective pore windows can be tuned. It is also believed that tuning oxygen exposure results in oxygen chemisorption process on the edge of the selective pore windows. US 2011/0100211 discloses typical conditions for tuning the amount of oxygen exposure. The pyrolysis temperature can also be tuned in conjunction with tuning the amount of oxygen exposure. It is believed that lowering pyrolysis temperature produces a more open CMS structure. This can, therefore, make the doping process more effective in terms of increasing selectivity for challenging gas separations for intrinsically permeable polymer precursors. Therefore, by controlling the pyrolysis temperature and the concentration of oxygen one can tune oxygen doping and, therefore, gas separation performance. In general, more oxygen and higher temperature leads to smaller pores. Higher temperatures generally cause the formation of smaller micro and ultramicropores, while more oxygen generally causes the formation of small selective ultramicropores without having a significant impact on the larger micropores into which gases are absorbed.

EXAMPLES

Comparative Example

Precursor monolithic composite fibers were spun from a spinneret from a single dope solution. The fibers are monolithic in the sense that there is no sheath/core composite structure. In other words, the dope solution was fed from a single annulus surrounding the bore fluid. The dope solution included wt % 6FDA:BPDA/DAM dissolved in wt % NMP.

The bore fluid and dope solution were fed to the spinneret at a rate of 1 cc/min and 3 cc/min, respectively at a spin temperature of C. The nascent fibers were passed through an air gap of 16 cm and coagulated in a water coagulant (quench) bath at a temperature of 38° C. The solid fibers were wound onto a take-up roll at rate of 15 m/min.

The resultant composite precursor hollow fibers were pyrolyzed in a 78.9 mm diameter tube furnace as follows. Beginning at room temperature, the furnace temperature was ramped (increased) at a rate of 13.3° C./min up to 250° C., ramped a rate of 3.8 C/min up to 535° C., ramped at a rate of 0.2 C/min up to 550° C., and maintained at 550° C. for 1.75 hours. The pyrolysis atmosphere was a mixture of 30 ppm $O_2$ in Argon fed to the tube furnace at a flow rate of 380 cc/min.

Example

Precursor composite hollow fibers were spun with a double spinneret from core and sheath dope solutions. The core dope solution included 22 wt % 6FDA:BPDA/DAM dissolved in 78 wt % NMP. The sheath dope solution included 5.5 wt % $CaBr_2$, 4% silica, and 16 wt % 6FDA:BPDA/DAM dissolved in 74.5 wt % NMP. The silica particles were obtained from Spectrum Chemical Corp. under the trade name Cab-O-Sil M-5. The bore fluid was a mixture of 85 wt % NMP and 15 wt % $H_2O$.

The bore fluid, the core dope solution, and the sheath dope solution were fed to the spinneret at a rate of 90 cc/hr, 200 cc/hr, and 40 cc/hr, respectively at a spin temperature of 79° C. The nascent fibers were passed through an air gap of 16 cm and coagulated in a water coagulant (quench) bath at a temperature of 38° C. The solid fibers were wound onto a take-up roll at rate of 15 m/min.

The resultant composite precursor hollow fibers were pyrolyzed in a 78.9 mm diameter tube furnace as follows. Beginning at room temperature, the furnace temperature was ramped (increased) at a rate of 13.3° C./min up to 250° C., ramped a rate of 3.8 C/min up to 535° C., ramped at a rate of 0.2 C/min up to 550° C., and maintained at 550° C. for 1.75 hours. The pyrolysis atmosphere was a mixture of 30 ppm $O_2$ in Argon fed to the tube furnace at a flow rate of 380 cc/min.

Separation Characteristics:

The pyrolyzed fibers were then tested for $CO_2$ permeance and $CO_2/CH_4$ selectivity. The results are shown in Table I below.

TABLE 1

Separation characteristics of CMS membranes.

| | $CO_2$ Permeance (GPUs) | $CO_2/CH_4$ selectivity |
|---|---|---|
| Comparative example | 244 ± 53 | 40 ± 8 |
| Example | 538 ± 116 | 45 ± 6 |

As seen in Table I, by spinning the fiber with a composite structure and by including silica particles in the core dope solution, a 12.5% increase in $CO_2/CH_4$ selectivity and a 120% increase in CO2 permeance may be realized in comparison to conventional monolithic fibers not having silica particles in the core dope solution. Taking the Background discussion into consideration, this tends to show that the problem of low permeance exhibited by conventional CMS membranes has been solved.

Figure 2:
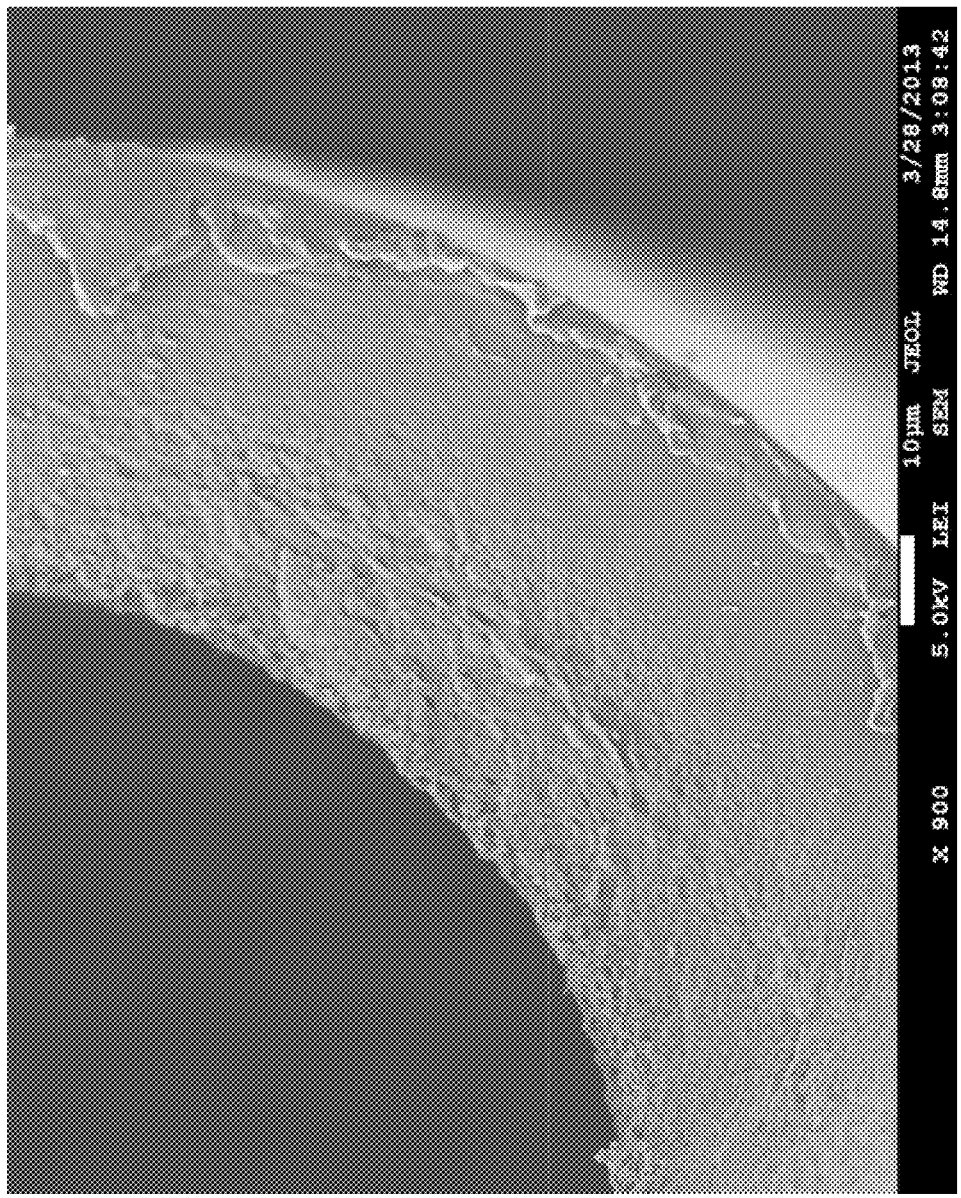
FIG. 2 is a SEM image of a CMS membrane fiber that lacks silica particles.
Figure 3:
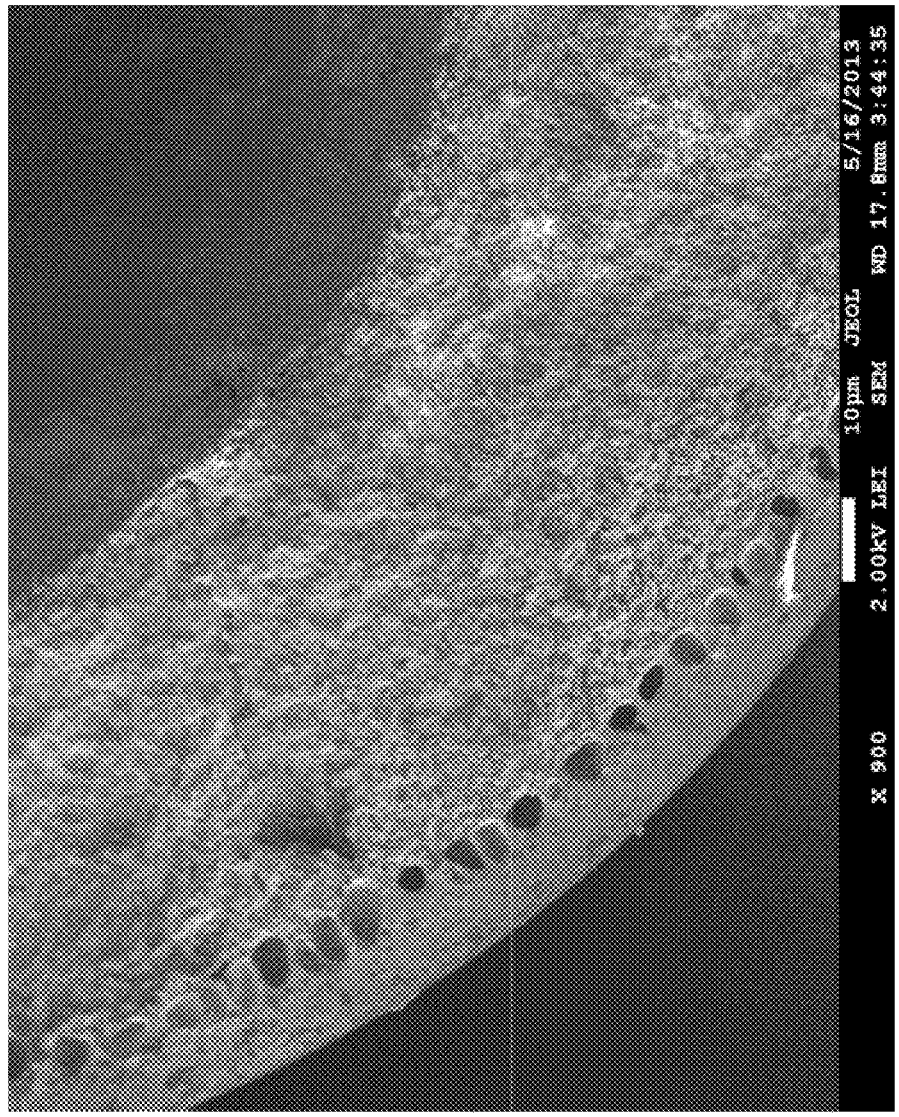
FIG. 3 is a SEM image of a CMS membrane fiber that includes silica particles in the core.

The advantages of producing CMS membranes from composite hollow fibers having sub micron $SiO_2$ particles in the core dope solution may also be seen in a comparison of FIGS. 2 and 3. As seen in FIG. 2, the core substructure of a monolithic fiber without silica particles collapses to result in a very thick dense separation layer. Recall that thick separation layers exhibit very low flux since flux is directly related to the separation layer thickness. As seen in FIG. 3, however, two distinct layers are seen. The sheath layer (which provides most of the separation) is thin and dense. The core layer is porous. This tends to show that the presence of silica in the core dope solution prevents core substructure collapse during pyrolysis and maintains porosity in the core substructure. Finally, it may be said that the sheath layer has a very small thickness. The permeability of a CMS membrane made from 6FDA:BPDA/DAM is 2300 Barrers. So, 538 GPUs measured for composite fiber will correspond to skin thickness of only 4 microns.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for producing a CMS membrane fiber, comprising the steps of:
    forming a composite precursor polymeric hollow fiber having a sheath covering a hollow core, the core being solidified from a core composition comprising essentially consisting of a polymeric core material dissolved in a core solvent or solvents, and silica particles insoluble in the core solvent or solvents, and optionally a pore former, the silica particles being disposed within pores formed in the polymeric core material, the sheath being solidified from a sheath composition comprising a polymeric sheath material dissolved in a sheath solvent, the silica particles having an average size of less than one micron, wherein there are no silica particles in the sheath; and
    pyrolyzing the composite precursor polymeric hollow fiber up to a peak pyrolysis temperature TP, wherein the silica particles have a melting point higher than TP, wherein the core polymeric material is made of 6FDA:BPDA/DAM and the sheath polymeric material is made of 6FDA:BPDA/DAM.

2. The method of claim 1, wherein a wt % of the polymer or copolymer in the core composition is lower than a wt % of the polymer or copolymer in the sheath composition.

3. The method of claim 1, wherein a wt % of the silica particles in the core composition is selected such that the polymeric sheath material shrinks along a length of the fiber no more than +/−15% than that of the polymeric core material, but in any case is at least 5 wt %.

4. A CMS membrane fiber produced according to the method of claim 1.

5. A CMS membrane module including a plurality of the CMS membrane fibers of claim 4.

6. A method for separating a gas mixture, comprising the steps of feeding a gas mixture to the CMS membrane module of claim 5, withdrawing a permeate gas from the CMS membrane module that is enriched in at least one gas relative to the gas mixture, and withdrawing a non-permeate gas from the CMS membrane module that is deficient in said at least one gas relative to the gas mixture.

* * * * *